(12) United States Patent
Ormsbee et al.

(10) Patent No.: US 11,698,184 B2
(45) Date of Patent: Jul. 11, 2023

(54) LIGHTING DEVICE WITH RECHARGEABLE BATTERY SANDWICH BETWEEN PRINTED CIRCUIT BOARDS

(71) Applicant: Nite Ize, Inc., Boulder, CO (US)

(72) Inventors: Bowden Ormsbee, Longmont, CO (US); Steven L. Lindquist, Broomfield, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 17/664,608

(22) Filed: May 23, 2022

(65) Prior Publication Data

US 2022/0316688 A1    Oct. 6, 2022

Related U.S. Application Data

(63) Continuation of application No. 17/217,371, filed on Mar. 30, 2021, now Pat. No. 11,339,954.

(51) Int. Cl.
| | |
|---|---|
| *F21V 23/04* | (2006.01) |
| *F21V 21/088* | (2006.01) |
| *F21V 23/00* | (2015.01) |
| *F21S 9/02* | (2006.01) |

(Continued)

(52) U.S. Cl.
CPC ........ *F21V 21/0885* (2013.01); *F21V 23/004* (2013.01); *F16B 45/02* (2013.01); *F21S 9/02* (2013.01); *F21Y 2115/10* (2016.08)

(58) Field of Classification Search
CPC ....... H05K 1/145; F21V 23/005; F21V 23/04; F21V 23/0414; F21V 23/06; F21L 4/08
See application file for complete search history.

(56) References Cited

U.S. PATENT DOCUMENTS 3,801,373 A * 4/1974 Spellman ................ H01M 6/42
429/86
3,992,225 A * 11/1976 Sykes .................. H01M 50/213
361/744

(Continued)

OTHER PUBLICATIONS

International Search Report and Written Opinion dated Apr. 15, 2022 issued in related PCT App. No. PCT/US2022/071407 (8 pages).

(Continued)

*Primary Examiner* — Ismael Negron
(74) *Attorney, Agent, or Firm* — Haynes and Boone, LLP (57) ABSTRACT

A lighting module includes a first printed circuit board (PCB) with a push button switch and a charging port, a second PCB with a light emitting diode (LED), a rechargeable battery sandwiched between the PCB's, and ring disposed between the PCB's and surrounding the battery. A device including the lighting module, a body having a cavity with an aperture, and a cap having a protrusion facing the body. The lighting module received in the cavity, with the cap covering the aperture. The protrusion and push button switch are positioned such that when the cap is pushed inward near the protrusion, the protrusion pushes the push button switch and activates the lighting module. The cap further includes a ridge surrounding the protrusion on the outward side, the ridge preventing the protrusion from being pushed into the push button switch, unless the cap is pressed at approximately a location of the protrusion.

1 Claim, 8 Drawing Sheets

(51) Int. Cl.
*F21Y 115/10* (2016.01)
*F16B 45/02* (2006.01)

(56) References Cited

U.S. PATENT DOCUMENTS

| | | | | |
|---|---|---|---|---|
| 4,918,631 A * | 4/1990 | Hara | ................... | G06K 19/077 |
| | | | | 340/146.2 |
| 6,394,621 B1 * | 5/2002 | Hanewinkel, III | ..... | F21L 4/005 |
| | | | | 362/203 |
| 6,462,780 B1 * | 10/2002 | Stephany | ............ | H01M 50/209 |
| | | | | 348/E5.025 |
| 6,942,357 B2 | 9/2005 | Parsons et al. | | |
| 7,261,433 B2 * | 8/2007 | Parsons | ................... | F21V 15/01 |
| | | | | 362/205 |
| 7,683,275 B2 | 3/2010 | Moore et al. | | |
| 7,726,852 B2 | 6/2010 | Sanoner et al. | | |
| 8,534,885 B2 * | 9/2013 | Moore | ....................... | B62J 6/20 |
| | | | | 362/500 |
| 8,550,653 B2 * | 10/2013 | Wilson | ................... | F21V 23/06 |
| | | | | 362/183 |
| 8,806,723 B2 * | 8/2014 | Martinson | .............. | B65D 63/00 |
| | | | | 24/3.12 |
| 9,046,229 B2 * | 6/2015 | Bennett | ...................... | F21L 4/08 |
| 10,215,383 B2 | 2/2019 | Grider et al. | | |
| 11,339,954 B1 * | 5/2022 | Ormsbee | ............. | F21V 23/0414 |
| 2002/0047646 A1 | 4/2002 | Lys et al. | | |
| 2003/0214259 A9 | 11/2003 | Dowling et al. | | |
| 2004/0201983 A1 | 10/2004 | Yu | | |
| 2005/0152138 A1 * | 7/2005 | Tatebe | .................... | F21V 21/08 |
| | | | | 362/200 |
| 2006/0176685 A1 * | 8/2006 | Galli | ...................... | F21L 4/005 |
| | | | | 362/157 |
| 2014/0265906 A1 | 9/2014 | Lim et al. | | |
| 2017/0041999 A1 | 2/2017 | Moore | | |
| 2017/0184260 A1 | 6/2017 | Munoz | | |
| 2017/0276303 A1 | 9/2017 | Chen | | |
| 2020/0124241 A1 | 4/2020 | Inskeep | | |

OTHER PUBLICATIONS

International Search Report and written Opinion dated Jun. 16, 2022 issued in related PCT App. No. PCT/US2022/071410 (8 pages).

* cited by examiner

LIGHTING DEVICE WITH RECHARGEABLE BATTERY SANDWICH BETWEEN PRINTED CIRCUIT BOARDS

CROSS REFERENCE TO RELATED APPLICATIONS

This application is a continuation of U.S. patent application Ser. No. 17/217,371 filed Mar. 30, 2021. This application is hereby incorporated by reference.

BACKGROUND

In various scenarios, the lighting of a device for visibility, safety, and enjoyment purposes is desirable. Lighting devices are desirable when they are small in size, modular, and applicable to a wide degree of configurations. In various embodiments, it may be desirable to have a single button control, such that the device is simple to make and easy to control.

SUMMARY

In one embodiment, a lighting device includes a body, including a cavity, the cavity having an aperture. The lighting device further includes a lighting module, the lighting module in the cavity, the lighting module having a push button switch. The lighting device further includes a cap, the cap covering the aperture, the cap having an aperture side and an outward side, the aperture side having a protrusion, the protrusion and the push button switch positioned such that they are proximate and when the cap is pushed inward near the protrusion, the protrusion pushes the push button and activates the lighting module, wherein the cap further includes a first ridge surrounding the protrusion on the outward side, the first ridge preventing the protrusion from being pushed into the push button, unless the cap is pressed at approximately a location of the protrusion. Alternatively, the ridge surrounds the location of the protrusion. In another alternative, the cap includes a second ridge of the aperture side of the cap, the second ridge surrounding the protrusion on the aperture side, the second ridge preventing the protrusion from being pushed into the push button, unless the cap is pressed at approximately a location of the protrusion. In one alternative, the first and second ridge and a surface of the cap cooperate to only allow advancement of the protrusion when the cap is pressed at approximately a location of the protrusion. In another alternative, the lighting device further includes a carabiner attached to the body. In another alternative, the lighting device further includes a flying disc attached to the body.

In one embodiment, a lighting device includes a body, including a cavity, the cavity having an aperture, the interior of the cavity having a plurality of notches. The lighting device further includes a lighting module, the lighting module in the cavity, the lighting module including a plurality of teeth alignable with the plurality of notches, a combination of the plurality notches and plurality of teeth providing a friction fit of the lighting module in the body. Alternatively, the lighting device further includes a cap, the cap covering the aperture, the cap having an aperture side and an outward side, the aperture side having a protrusion, the protrusion and the push button switch positioned such that they are proximate and when the cap is pushed inward near the protrusion, the protrusion pushes the push button and activates the lighting module, wherein the cap further includes a first ridge surrounding the protrusion on the outward side, the first ridge preventing the protrusion from being pushed into the push button, unless the cap is pressed at approximately a location of the protrusion. Alternatively, the ridge surrounds the location of the protrusion.

In one embodiment, a lighting module includes a first printed circuit board and a second printed circuit board. The lighting module further includes a battery sandwiched between the first printed circuit board and the second printed circuit board, the first printed circuit board and the second printed circuit board holding the battery in place and forming the lighting module. Alternatively, the lighting module includes a side wall, the side wall located between the first printed circuit board and the second printed circuit board and enclosing the battery in the lighting module. In one alternative, one of the first printed circuit board and the second printed circuit board includes a charging port for the battery. In another alternative, one of the first printed circuit board and the second printed circuit board includes a push button switch. Alternatively, one of the first printed circuit board and the second printed circuit board includes an LED. In another alternative, the LED and the push button switch are not on a same one of the first printed circuit board and the second printed circuit board. Alternatively, the lighting module further includes a post, the post interconnecting the first printed circuit board and the second printed circuit board. Alternatively, the sidewall includes a plurality of teeth alignable with a plurality of notches in a body of a lighting device, a combination of the plurality notches and plurality of teeth providing a friction fit of the lighting module in the body.

In one embodiment, a lighting device includes a body, including a cavity, the cavity having an aperture. The lighting device further includes a lighting module, the lighting module in the cavity, the lighting module having a push button switch, a first printed circuit board and a second printed circuit board, and a battery sandwiched between the first printed circuit board and the second printed circuit board, the first printed circuit board and the second printed circuit board holding the battery in place and forming the lighting module. The lighting device further includes a cap, the cap covering the aperture, the cap having an aperture side and an outward side, the aperture side having a protrusion, the protrusion and the push button switch positioned such that they are proximate and when the cap is pushed inward near the protrusion, the protrusion pushes the push button and activates the lighting module, wherein the cap further includes a first ridge surrounding the protrusion on the outward side, the first ridge preventing the protrusion from being pushed into the push button, unless the cap is pressed at approximately a location of the protrusion. Alternatively, the body includes a carabiner portion. In one alternative, the body portion mounts in a flying disc.

DETAILED DESCRIPTION

Certain terminology is used herein for convenience only and is not to be taken as a limitation on the embodiments of the systems and method of a lighting device and lighting module. The lighting module in many embodiments is designed to fit in a wide variety of receivers located in the lighting the device. Embodiments of the lighting device may take on various forms, including the ones shown in the present application. The designs herein, in many configurations, provide for a modular system, where the lighting module may fit in a wide variety of devices (lighting devices).

Figure 1:
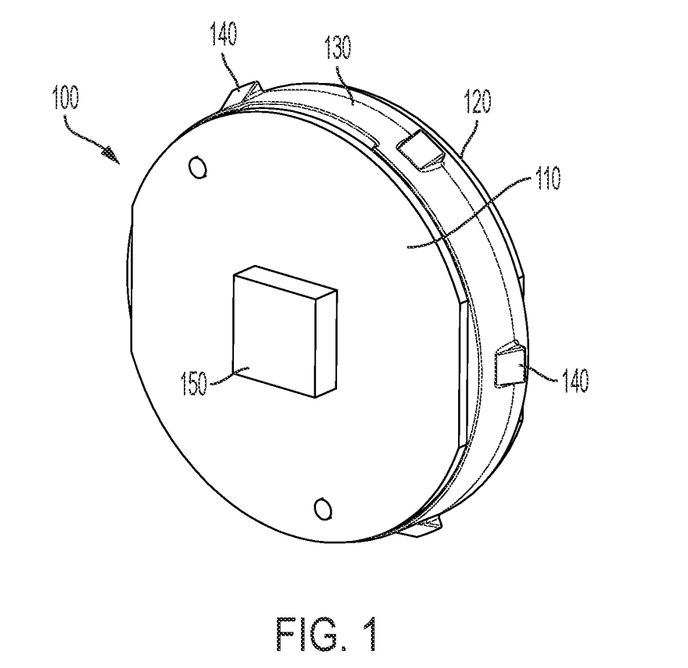
FIG. 1 shows one embodiment of a lighting module.

FIG. 1 shows one embodiment of a lighting module 100. Lighting module 100 generally includes 2 printed circuit boards (PCB) that are used for circuitry and to support and enclose the lighting module 100. Lighting module 100 includes PCB 110 and PCB 120. A plastic ring 130 is placed between PCB 110 and PCB 120 to complete the lighting module 100 enclosure. Plastic ring 130 includes protrusions 140 that provide for a fiction or snap fit way of holding the lighting module 100 in a lighting device. This will be described in more detail below. In contrast to many lighting modules, the PCBs form a portion of the module, which saves fabrication costs. Additionally, visible in FIG. 1 is LED 150. This LED in many configurations provides for the vertical projection of light, that is perpendicular to the largest outward facing face. Alternative, a 90° LED could be used to direct light parallel to the PCB or inline with the PCB. In many embodiments, the PCB 110 may also include exposed microprocessors, capacitors, and or other circuitry. This is not shown in the embodiment of the device in FIG. 1.

Figure 2:
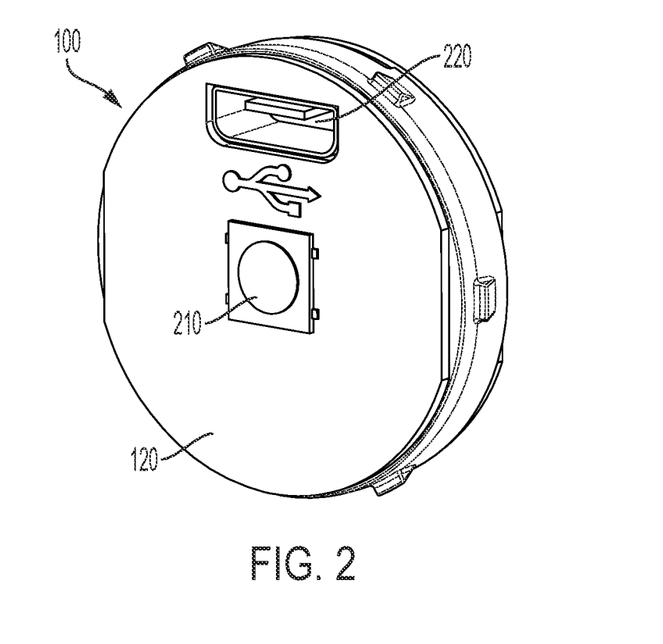
FIG. 2 shows a reverse view of the lighting module of FIG. 1.

FIG. 2 shows another view of the lighting module 100. In this view, push button switch 210 (momentary) is shown. Additionally, charging port 220 is shown. In many embodiments, charging port 220 may be a micro USB port. In alternatives, other charging ports are possible, depending on the total size of the device, including USB ports. As with the view of FIG. 1, PCB 120 may include exposed circuitry or interconnections.

Figure 3:
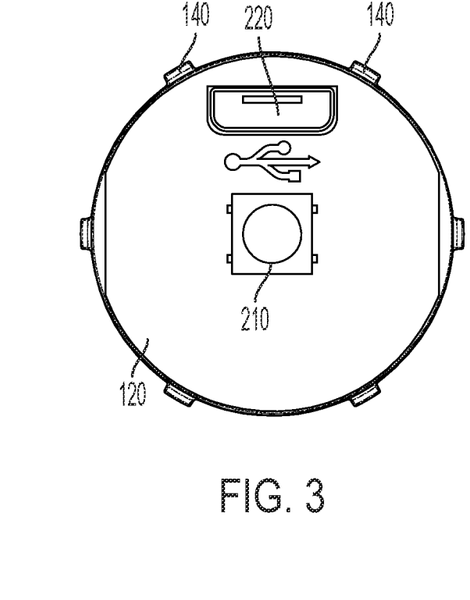
FIG. 3 shows a flat top view of the lighting module of FIG. 1.
Figure 4:
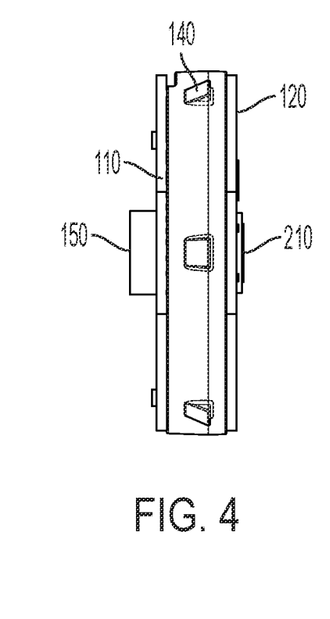
FIG. 4 shows a side view of the lighting module of FIG. 1.
Figure 5:
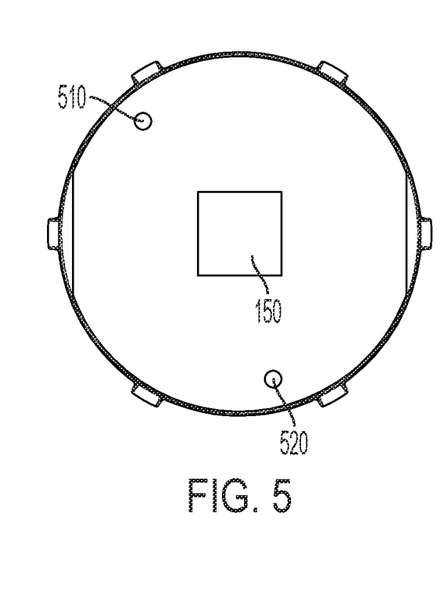
FIG. 5 shows a bottom view of the lighting module of FIG. 1.

FIG. 3 shows a top view of lighting module 100. FIG. 4 shows a side view of lighting module 100. FIG. 5 shows a bottom view of lighting module 100. Additionally, visible in FIG. 5 are the exposed ends of posts 510, 520. These posts are designed to hold the PCBs 110, 120 together. These may be formed of plastic, metal, solder, or other material.

Figure 6:
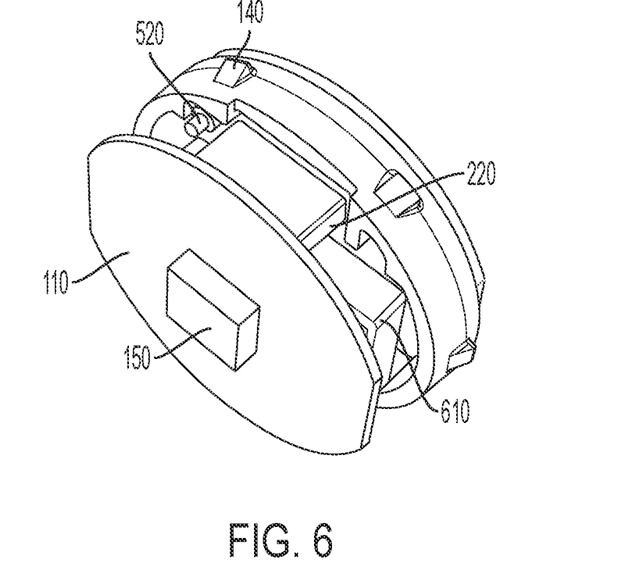
FIG. 6 shows an exploded view of the lighting module of FIG. 1.
Figure 7:
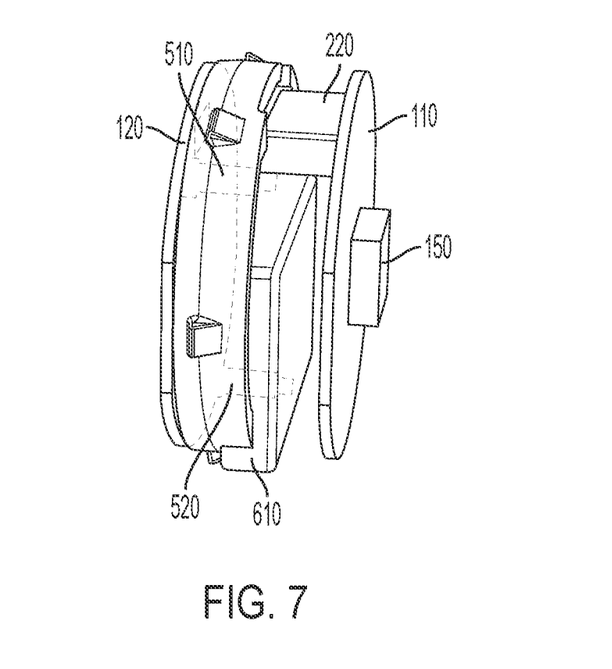
FIG. 7 shows an exploded X-Ray view of the lighting module of FIG. 1.

FIG. 6 shows an exploded view of lighting module 100. In this view battery 610 is visible. A useful feature of the lighting module is the protection of battery 610 by PCBs 110, 120 and plastic ring 130. In the embodiment shown, plastic ring 130 is formed of plastic, however in alternatives, it may take on a variety of materials. In many configurations, if the battery were to be in a less protected location, the leads to the battery may be dislodged or other damage may occur to the device. FIG. 7 shows another exploded view where the posts 510, 520 are mode visible and it is shown how they potentially interconnect the device.

In many embodiments, the configuration of the lighting module 100 may vary. The principles of the module include providing a discrete package containing all aspects needed to provide lighting. In many embodiments, it is a pair of circuit boards that form the top and bottom of the module. In many configurations, this is advantageous because circuit boards a required for the wiring of the LED system. In many configurations, one of the PCBs has an LED mounted thereon and a button mounted on the other PCBs. In alternatives, the button and the LED may be on the same PCB. In many embodiment, the module further includes an encircling frame, that is located between the two PCBs. This creates an enclosure. Additionally, in many embodiments, the PCBs have at least one structural component that span between them and offer support to the enclosure. In many embodiments, these are metal pin posts to provide electrical contact between bottom and top circuit boards and also providing support to hold PCB's together. In alternatives, connectors or other means of electrical contact may be used to hold the PCB together. In alternative, the structure components may be a set of two plastic posts. In alternatives, one of more posts, connectors, or other features may be used to hold the PCBs together. In many configurations, the battery is housed between the PCBs in the enclosure. This provides for a protected arrangement for the battery and provides for enhancement of the structure. In many embodiments, the device includes a charging port. In many configurations, the lighting module has protrusions or other features designed to hold it in the body of a lighting device. The lighting device may be a wide range of items. Typically, the body of the lighting device is transparent or translucent. This is because when the lighting module is inserted into it, the LED generally provides light in a direction perpendicular to the PCB it is mounted on and the device is designed to project this light. Alternatively, fibers or light pipes may be located in the lighting device in order to transmit the light. In many embodiments, the push button or momentary switch is located on the opposite side from the LED and is responsive to being pushed. The structure of the lighting module provides for a firm mounting position for the push button, such that the module may survive pressure without being damaged. In many embodiments, the lighting device includes a flexible cap that the use may press on and therefore actuate the push button. In many configurations, the flexible cap includes a feature or a protrusion oriented to align with the push button. In many configurations, the flexible cap may include a ridge to prevent the cap from depressing the push button unless the cap is pressed at the actuation point. A wide variety of lighting devices may be designed to include the lighting module and structural system. The examples given herein are for a flying disc and a personal lighting device. However, the lighting module may be integrated into a ball, beacon, lamp, or other lighting device. There is no limit to the types of lighting devices.

Figure 8:
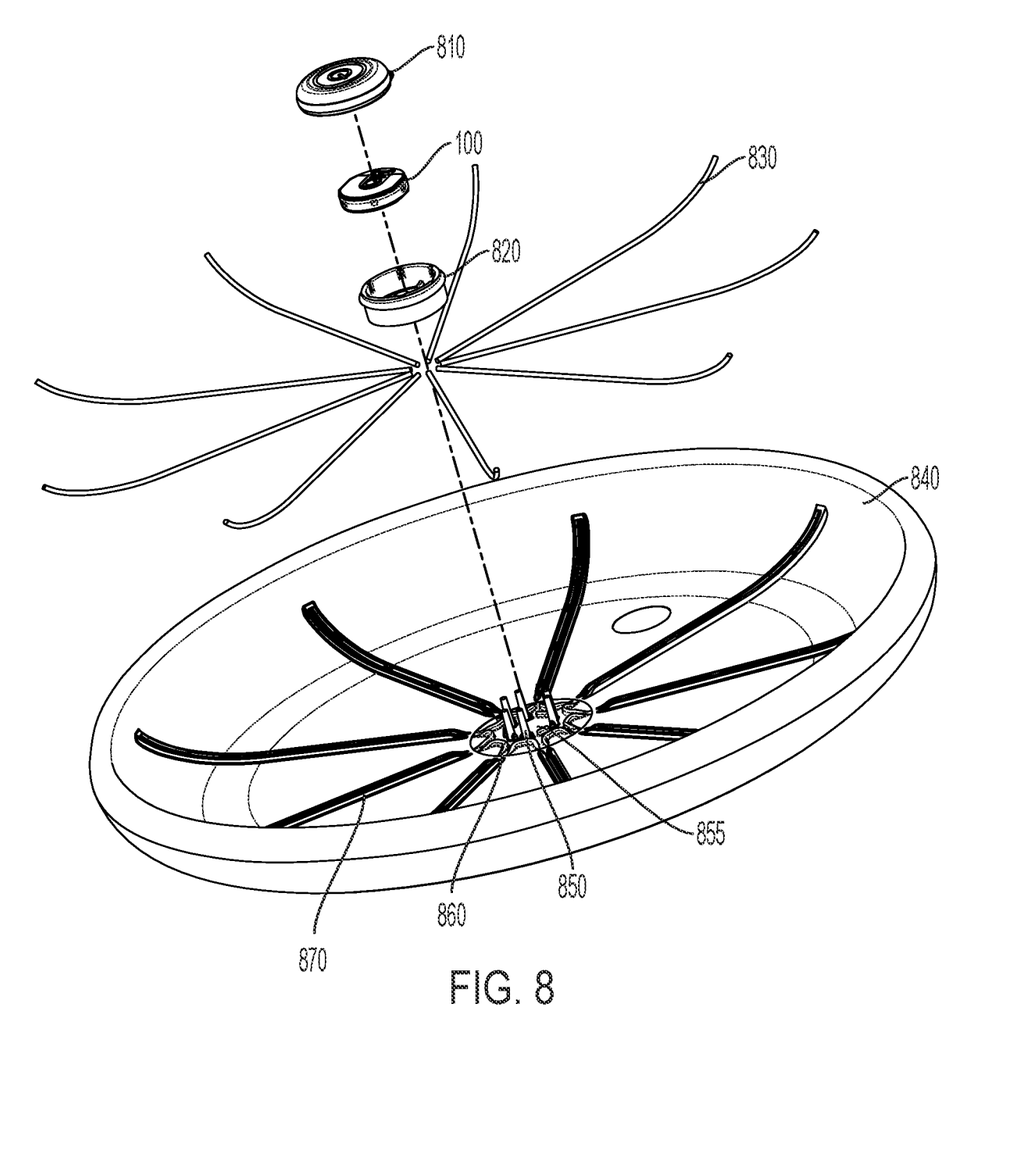
FIG. 8 shows an exploded view of a flying disc including a lighting module.

FIG. 8 shows one embodiment of a lighting device, in this case a flying disc 840. As shown in FIG. 8, the lighting device includes a cap 810, a lighting module 100 (which may be the lighting module described herein or in alternatives, another lighting module), a body 820, a plurality of optical fibers 830, a disc 840 having a receiving area 850 and a plurality of mounting posts 855. When assembled, the body 820 may be press fit on to mounting posts 855. Body 820 has a plurality of apertures that are tapered, such that when mounting posts 855 are inserted that are compressed and expand on the opposite side, making the body 820 difficult to remove. Various other techniques may be used to attach the body 820 to disc 840. Additionally, disc 840 includes a plurality of fiber directors 860, that arrange the optical fibers 830 to their proper placement, with their ends adjacent a corresponding lens area 1130. In this case the fiber directors 860 are raised U-shaped moldings that the fibers may friction or interference fit between. Distal from the fiber directors are ridges 870 that further position the optical fibers.

Figure 9:
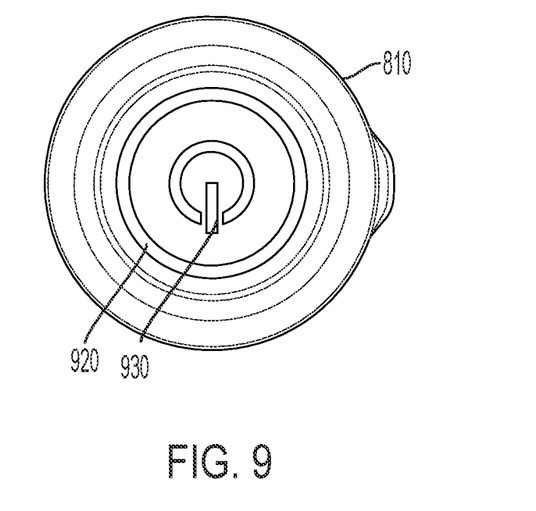
FIG. 9 shows a cap for a lighting device.
Figure 10:
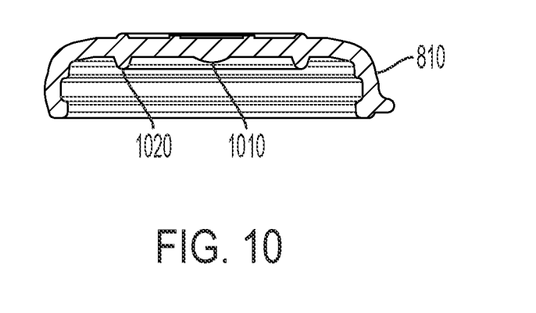
FIG. 10 shows a cross-section of the cap of FIG. 9.

FIG. 9 shows a close-up view of one embodiments of cap 810. Cap 810 is specifically designed to prevent accidental activation. As shown in FIG. 9 a ridge 920 surrounds the power activation area 930. When a user presses on power activation area 930 the cap depresses and activates the push button switch 210 of the lighting module. The ridge 920 help sets back the power activation area 930 so that it is not accidentally pressed. FIG. 10 shows additional detail on how the cap 810 is configured to prevent activation. In the cross-sectional view, two additional features are visible. First, the underside of cap 810 includes a central protrusion 1010 and a ridge 1020 that encircles the central protrusion. In operation, this configuration provides for the cap 810 to flex in a fashion, where only when the cap is depressed approximately in the power activation area 930 will the central protrusion 1010 depress the push button switch 210 of the lighting module. When it is pressed elsewhere, the ridge 1020 presses against the lighting module instead of the central protrusion 1010 pressing with sufficient force to cause activation. The orientation of the ridge 1020 also creates characteristics of the stiffness of the cap so it is more likely to flex around the center point when pressed there, but less likely to flex when pressed in other locations. In this way, the device is less likely to accidentally be activated. This cap is shown as being deployed in the disc context discussed, however, may be used in a wide variety of contexts.

Figure 11:
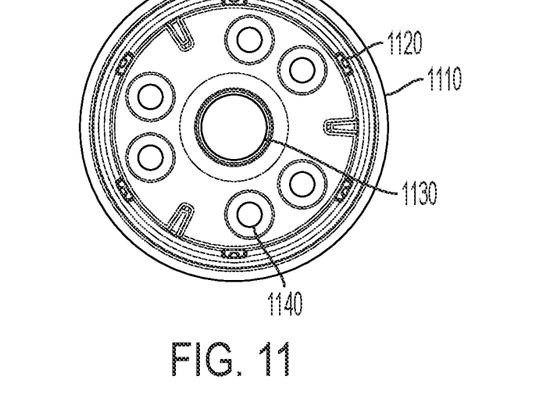
FIG. 11 shows a body for a lighting device.

FIG. 11 shows a body 820 for receiving the lighting module. As previously indicated, body 820 includes a plurality of notches 1120. These notches are configured to fit with the protrusions 140. This is accomplished in a friction or interference type configuration. This holds the lighting module firmly in the body. In alternatives, other types of snap-fit or other interlocking systems may be used. Additionally, body 820 includes a plurality of apertures 1140 for receiving the plurality of mounting posts 855. Finally, lens area 1130 on the base of the body 820 is configured to receive light from the LED 150.

Figure 12:
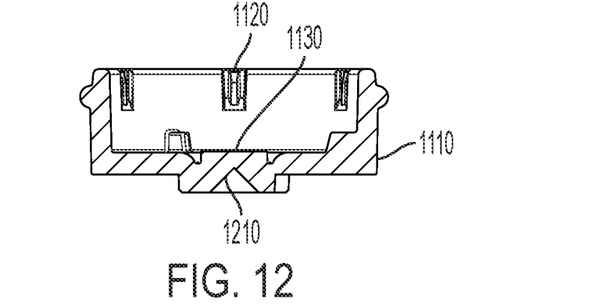
FIG. 12 shows a cross-section of the body of FIG. 11.

FIG. 12 shows a cross-sectional view of body 820. In this view the configuration of the notches 1120 may be further viewed. In the configuration shown, the notches include a central portion that protrudes towards the center of the body such that these pieces either deform or cause the notches to deform when the two interface. Additionally, lens area 1130 is shown as having an angled lens 1210 carved into it, providing for the refraction/reflection of light projected downward toward the angled lens. This lens 1210 essentially provides for a 90-degree redirection of the light. In some embodiments, lens 1210 is simply a 45-degree angle. In other embodiments, lens 1210 may be a parabola type curve. This results in an essentially flat radial projection of light. In any case, the point of this configuration is to redirect the light in a horizontal/radial pattern.

Figure 13:
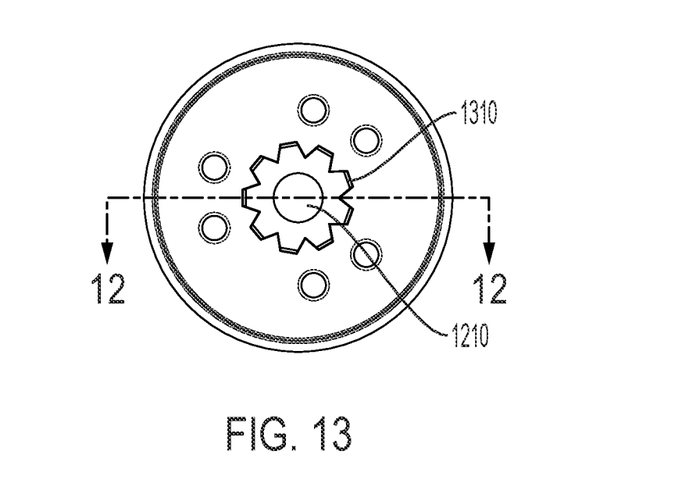
FIG. 13 shows a bottom view of the body of FIG. 11.

FIG. 13 shows a bottom view of body 820. Here, spokes 1310 are small arms that are configured to internally reflect light and direct the light to the ends of the spokes. The ends of the spokes 1310 are polished and configured to interface with the optical fibers 830, such that light is projected into them.

Figure 14:
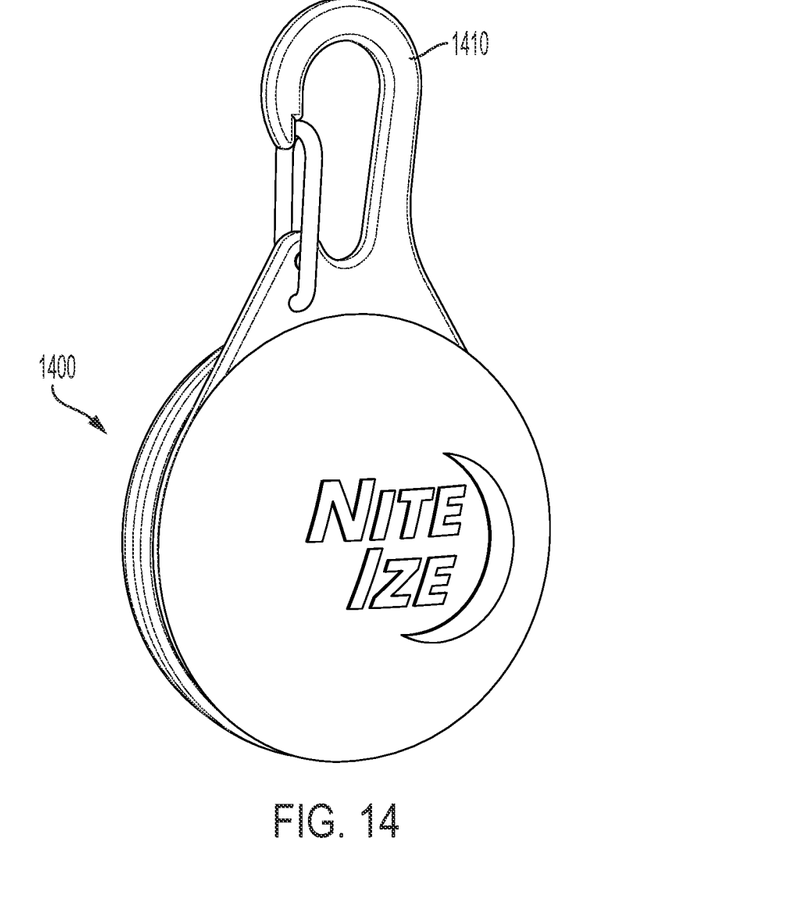
FIG. 14 shows a lighting device.
Figure 15:
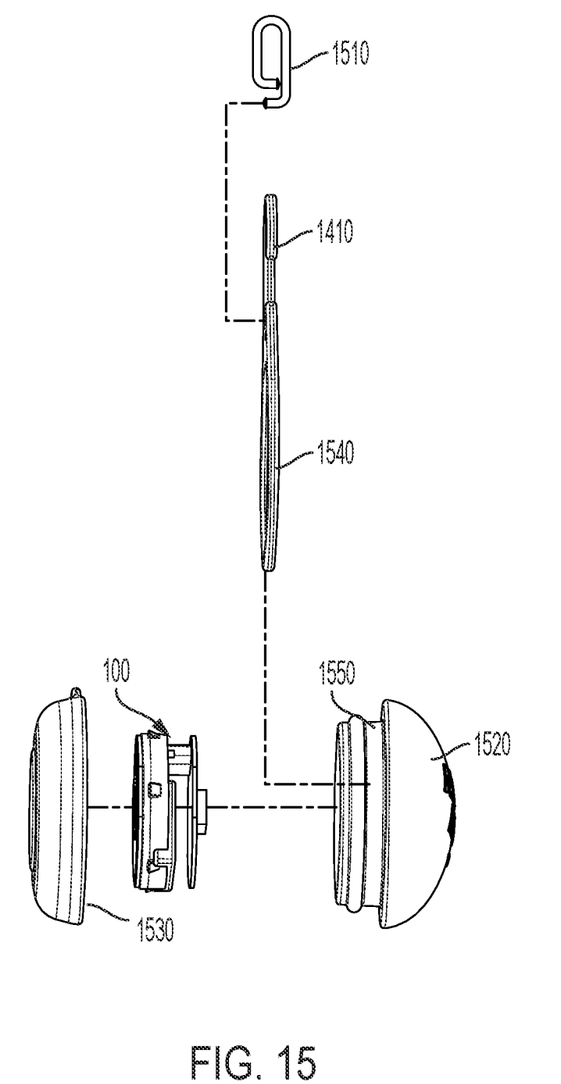
FIG. 15 shows an exploded view of the lighting device of FIG. 14.

FIG. 14 shows another possible embodiment of a lighting device 1400. In this embodiment, lighting device 1400 includes a carabiner portion 1410. FIG. 15 shows an exploded view of lighting device 1400. In this view, lighting module 100 may be seen as well as body 1520 and cap 1530. Carabiner portion 1410 includes a gate 1510 and a circular loop that is designed to fit around lip 1550 on body 1520. Module 100 fits into body 1520 as previous described, with the notches of the body 1520 receiving the protrusions of the lighting module. Body 1520 and cap 1530 are translucent, such that they may pass and refract light from lighting module 100. In many configuration, the sidewall of the body piece includes a plurality of teeth wedge which into a softer plastic material body like TPR, TPE, TPU, Silicone etc. with an interference locking friction fit of the light module in the body. The teeth may bite into the soft plastic material. Note that cap 1520 can take on virtually any form, including a spoke mounting device or other light emitting device. For instance, the body piece may be modified to have grooves, tabs, or other features to connect with another object or surface. These connectors may include magnets, snaps, Velcro, latches or other features. Generally, the body piece will be translucent, transparent, or include features that transfer light.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A lighting module, comprising:
   a first printed circuit board and a second printed circuit board;
   a battery sandwiched between the first printed circuit board and the second printed circuit board, the first printed circuit board and the second printed circuit board enclosing and holding the battery in place;
   a side wall located between the first printed circuit board and the second printed circuit board and enclosing the battery;
   a battery charging port provided in one of the first printed circuit board and the second printed circuit board;
   a push button switch provided in one of the first printed circuit board of the second printed circuit board; and
   an LED provided in one of the first printed circuit board of the second printed circuit board, wherein the LED and the push button switch are not on a same one of the first printed circuit board and the second printed circuit board;
   a post interconnecting the first printed circuit board and the second printed circuit board;
   a body having a plurality of notches; and
   a plurality of teeth provided in the sidewall, wherein the plurality of notches in the body correspond to the plurality of teeth in the sidewall to provide a friction fit of the lighting module in the body.

\* \* \* \* \*